(12) United States Patent
Takahashi

(10) Patent No.: US 12,398,585 B2
(45) Date of Patent: Aug. 26, 2025

(54) POWER SUPPLY SYSTEM

(71) Applicant: TOYOTA JIDOSHA KABUSHIKI KAISHA, Toyota (JP)

(72) Inventor: Kensuke Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 18/437,728

(22) Filed: Feb. 9, 2024

(65) Prior Publication Data

US 2024/0426147 A1    Dec. 26, 2024

(30) Foreign Application Priority Data

Jun. 22, 2023   (JP) ................... 2023-102235

(51) Int. Cl.
*E05B 81/80*  (2014.01)
*B60R 16/033*  (2006.01)
*E05B 81/04*  (2014.01)

(52) U.S. Cl.
CPC ............ *E05B 81/80* (2013.01); *B60R 16/033* (2013.01); *E05B 81/04* (2013.01)

(58) Field of Classification Search
CPC .......... E05B 81/52; E05B 81/80; E05B 81/04; B60R 16/033
USPC ........................................ 70/277
See application file for complete search history.

(56) References Cited

U.S. PATENT DOCUMENTS

| | | | | |
|---|---|---|---|---|
| 7,765,043 B2* | 7/2010 | Kobayashi | .......... | B05B 11/1016 |
| | | | | 701/36 |
| 11,247,575 B2* | 2/2022 | Kojima | .................... | B60L 53/66 |
| 11,279,254 B2* | 3/2022 | Ando | ..................... | B60L 53/60 |
| 11,338,697 B2* | 5/2022 | Ichikawa | ................ | B60L 1/003 |
| 2015/0001926 A1* | 1/2015 | Kageyama | .............. | E05B 81/86 |
| | | | | 307/10.1 |
| 2015/0336468 A1* | 11/2015 | Sugiyama | ............... | B60L 58/21 |
| | | | | 701/22 |
| 2017/0197565 A1* | 7/2017 | Yoneyama | .......... | B60R 16/0238 |
| 2019/0288345 A1* | 9/2019 | Hinterberger | ....... | H01M 10/425 |
| 2020/0132034 A1* | 4/2020 | Ando | ................... | F02N 11/0866 |
| 2020/0180592 A1* | 6/2020 | Tanoue | ............. | H01M 8/04029 |
| 2021/0237687 A1* | 8/2021 | Tsuchiya | ................ | H04W 4/48 |
| 2021/0288510 A1* | 9/2021 | Dragan | .................. | B60R 16/03 |
| 2021/0370789 A1* | 12/2021 | Kawai | .................... | H02J 7/0047 |
| 2022/0009365 A1* | 1/2022 | Ando | ...................... | B60R 25/01 |
| 2022/0009376 A1* | 1/2022 | Kawai | ..................... | B60L 50/66 |
| 2022/0014604 A1* | 1/2022 | Satoh | .................... | G06F 21/445 |
| 2022/0083050 A1* | 3/2022 | Oyama | ................ | G05D 1/0022 |

(Continued)

FOREIGN PATENT DOCUMENTS

JP    5618024 B2    9/2014
JP    2022-157418 A    10/2022

*Primary Examiner* — Nathan Cumar
(74) *Attorney, Agent, or Firm* — SoraIP, Inc.

(57) ABSTRACT

A power supply system for a vehicle for controlling power supply from a second power supply provided for backup of the first power supply to a plurality of in-vehicle equipment, comprising a relay inserted between the second power supply and the first in-vehicle equipment, when a collision of the vehicle is detected during the backup operation of the first power supply by the second power supply, the electric power supplied from the second power supply to the second in-vehicle equipment, characterized in that it supplies in parallel to the first in-vehicle equipment via the relay.

3 Claims, 3 Drawing Sheets

(56) References Cited

U.S. PATENT DOCUMENTS

2022/0083052 A1\* 3/2022 Oyama ................ H04W 4/024
2022/0144288 A1\* 5/2022 Mitsutani ................ B60L 55/00

\* cited by examiner

POWER SUPPLY SYSTEM

CROSS-REFERENCE TO RELATED APPLICATION

This application claims priority to Japanese Patent Application No. 2023-102235 filed on Jun. 22, 2023, incorporated herein by reference in its entirety.

BACKGROUND

1. Technical Field

The present disclosure relates to a power supply system for a vehicle that controls electric power supply from a sub-power supply provided for backup of a main power supply, to a plurality of pieces of in-vehicle equipment.

2. Description of Related Art

Japanese Patent No. 5618024 discloses a backup power supply device that has a capacitor as a sub-battery, a charging circuit provided on a charging path of the capacitor and performing a step-down operation, a step-up circuit provided on an output path of the capacitor, and a door lock release output terminal connected to the step-up circuit. This backup power supply device described in U.S. Pat. No. 5,618,024 performs backup of a door lock (mechanical door) system in which a door is locked/unlocked using a motor in an emergency such as when a main battery is damaged due to a traffic accident or the like, using the capacitor.

SUMMARY

In recent years, there are vehicles in which both the above door lock system and an "e-Latch" system, for locking/unlocking a door using a latch mechanism, are installed. In a vehicle equipped with both the door lock system and the e-Latch system in this way, when attempting to realize backup processing of each system, door unlock control of these systems differ from each other. Accordingly, separate sub-batteries are necessary for backup. Thus, attempts to integrate backup functions of the two systems into one so that only one sub-battery is necessary are not easy, since there is a possibility that changes will need to be made to the control (complication of control), the number of parts other than the sub-battery will increase, and so forth.

In this way, there is room for further study regarding a power supply system capable of performing backup processing of both the door lock system and the e-Latch system in an emergency, in terms of increased size, increased number of parts, and increased costs.

The present disclosure has been made in view of the above problem, and an object thereof is to provide a power supply system capable of suppressing increase in size, increase in the number of parts, increase in costs, and so forth.

In order to solve the above problem, according to an aspect of the technique of the present disclosure, a power supply system for a vehicle, for controlling electric power supply from a second power supply provided for backup of a first power supply to a plurality of pieces of in-vehicle equipment, includes a relay interposed between the second power supply and first in-vehicle equipment. When collision of the vehicle is detected during a backup operation of the first power supply by the second power supply, electric power supplied from the second power supply to second in-vehicle equipment is supplied in parallel to the first in-vehicle equipment via the relay.

According to the power supply system of the present disclosure, increase in size, increase in the number of parts, increase in costs, and so forth, can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The power supply system according to the present disclosure includes a relay between the sub-power supply and the mechanical door system, and supplies electric power supplied from the sub-power supply to the E latch system in parallel to the mechanical door system through the relay when a collision of the vehicle is detected during the backup operation of the main power supply by the sub-power supply. Thus, both the mechanical door system and the E latch system can be supplied with backup power with a single output from one sub-power supply (integration of the backup function). Hereinafter, an embodiment of the present disclosure will be described in detail with reference to the drawings.

EMBODIMENT

Configuration

Figure 1:
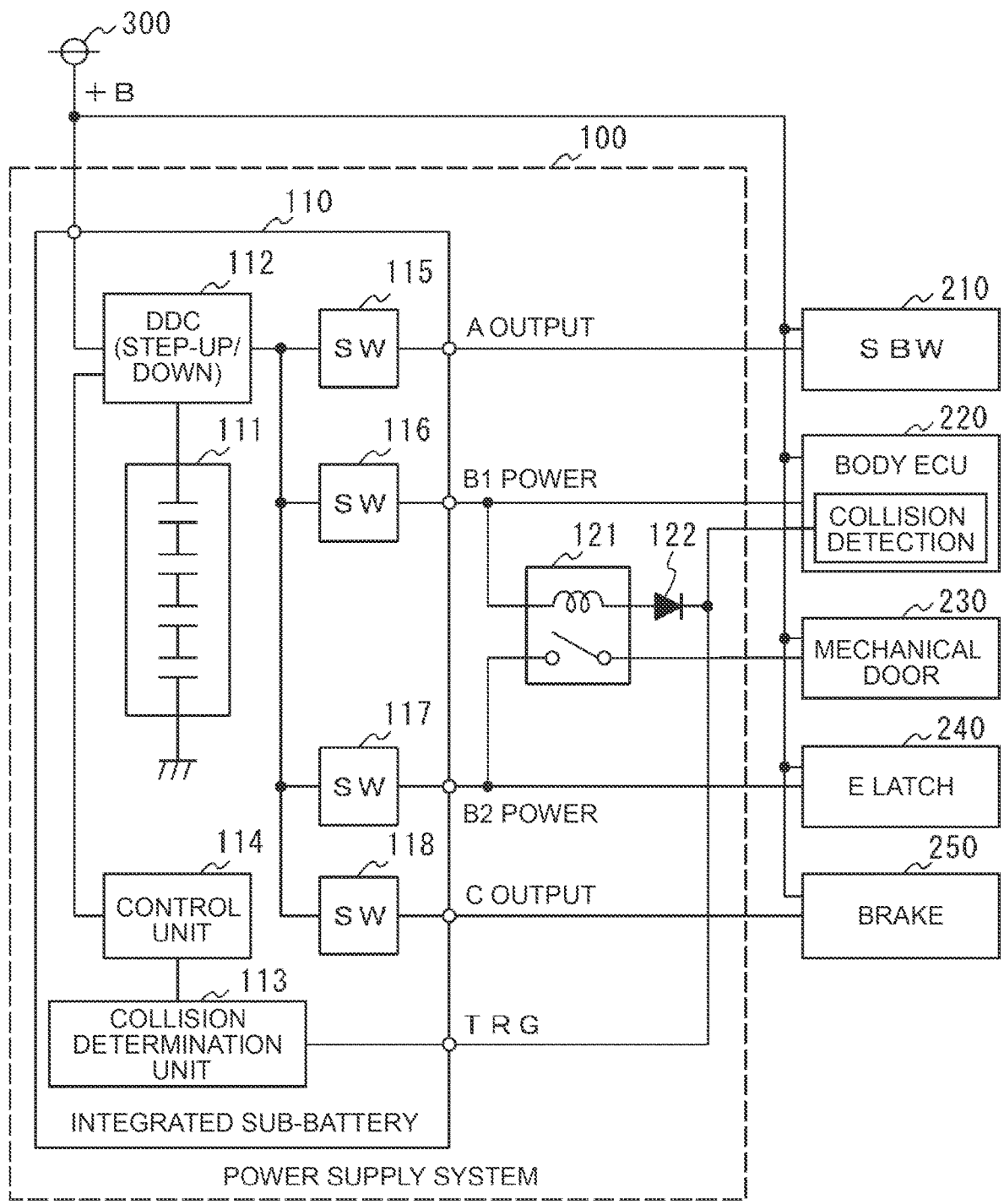
FIG. 1 is a functional block diagram of a power supply system and a peripheral portion thereof according to an embodiment of the present disclosure.

FIG. 1 is a functional block diagram of a power supply system 100 and a peripheral portion thereof according to an embodiment of the present disclosure. The functional block illustrated in FIG. 1 includes a power supply system 100, a plurality of systems including an SBW 210, a body ECU 220, a mechanical door 230, an E-latch 240, and a brake 250, and a first power supply 300. The power supply system 100, SBW 210, the body ECU 220, the mechanical door 230, the E-latch 240, the brake 250, and the first power supply 300 may be mounted on vehicles.

The first power supply 300 provides power to a plurality of systems, such as the SBW 210, the body ECU 220, the mechanical door 230, the E-latch 240, and the brake 250. The first power supply 300 is a power supply (+B power supply). Examples of the first power supply 300 include a generator including an alternator that generates electric power and a DCDC converter that converts the generated electric power into a predetermined voltage, and a predetermined power supply configuration such as a rechargeable battery that is configured to be chargeable and dischargeable such as a lithium-ion battery or a lead-acid battery.

A plurality of systems such as an SBW 210, a body ECU 220, a mechanical door 230, an E-latch 240, and a brake 250 are in-vehicle equipment for realizing predetermined functions related to vehicles. These may be systems that require a particularly redundant power supply configuration. The plurality of systems is connected and configured such that electric power can be supplied from the first power supply 300 without the power supply system 100, and backup power based on the first power supply 300 can be supplied from the power supply system 100. Note that the plurality of systems mounted on the vehicle are not limited to those illustrated in FIG. 1.

SBW 210 is a shift-by-wire control system that can change the gear stage of a transmission (not shown) by an electric signal. SBW 210 includes an SBW-ECU that is an electronic control unit that converts a shift operation of a driver into an electric signal, and an SBW-ACT that is an actuator that changes a gear stage based on an electric signal instructed from SBW-ECU. SBW 210 is connected to an output (A output) of SW 115 so as to be able to supply power from an integrated sub-battery 110 described later.

The body ECU 220 is one of electronic control units that are equipment mounted on a vehicle, and performs control related to a body system of a so-called vehicle. The body ECU 220 according to the present embodiment can detect that a collision of a vehicle has occurred, and when a collision of the vehicle has been detected, a predetermined TRG is outputted to the power supply system 100. TRG signal may be, for example, a signal that is High if a collision of the vehicle is not detected and a signal that is Low if a collision of the vehicle is detected. The body ECU 220 is connected to an output (B1 output) of SW 116 so as to be able to supply power from an integrated sub-battery 110 described later.

The mechanical door 230 is a system that performs door lock control capable of locking/unlocking a door of a vehicle. The mechanical door 230 includes a door unlock ECU, a door unlock ACT, and the like. The door unlock ECU is an electronic control unit that converts a locking and unlocking operation of the driver into an electric signal. The door unlock ACT is a motor actuator that changes a locked state and an unlocked state of a door of a vehicle based on an electric signal instructed from a door unlock ECU. As the mechanical door 230, a vehicle speed sensitive automatic door system can be exemplified.

Like the mechanical door 230, the E latch 240 is another system that performs door lock control capable of locking/ unlocking the door of the vehicle. The E latch 240 has an electric latch mechanism that does not require power supply switching by a mechanical relay for motor driving. The E-latch 240 is connected to an output (B2 output) of SW 117 so as to be able to supply power from an integrated sub-battery 110, which will be described later.

The brake 250 is a system that performs brake control capable of generating a braking force in the vehicle. The brake 250 includes a brake ECU that is an electronic control unit that converts a brake operation of a driver into an electric signal, and a brake ACT that is an actuator that generates a braking force based on an electric signal instructed from the brake ECU. The brake 250 is connected to an output (C output) of SW 118 so as to be able to supply power from an integrated sub-battery 110 described later.

The power supply system 100 is configured to function as a sub-power supply to back up electric power to SBW 210, body ECU 220, mechanism door 230, E-latch 240, and brake 250 when power to SBW 210, body ECU 220, mechanism door 230, E-latch 240, and brake 250 from the first power supply 300 is abnormal, such as due to a power failure of the first power supply 300, which is the main power supply.

The power supply system 100 illustrated in FIG. 1 includes an integrated sub-battery 110 including a second power supply 111, a DDC 112, a collision determination unit 113, a control unit 114, and a plurality of SW 115 118, a relay 121, and a diode 122.

The second power supply 111 is, for example, a power supply source constituted by a secondary battery such as a lithium-ion battery configured to be chargeable and dis- chargeable, or a power storage element such as a capacitor. The second power supply 111 is provided as a sub power supply source for backing up the first power supply 300, which is a main power supply source, in an emergency or the like. The second power supply 111 is connected to DDC 112 so that the electric power of the first power supply 300 can be charged and the electric power (back-up electric power) stored therein can be discharged to SBW 210, the body ECU 220, the mechanical door 230, the E-latch 240, and the brake 250.

DDC 112 is a DCDC converter (step-up/step-down type) for charging and discharging the electric power of the second power supply 111. In this DDC 112, the electric power inputted from the first power supply 300 can be converted into electric power of a predetermined voltage and outputted to the second power supply 111 based on an instruction (such as a voltage command value) from the control unit 114. DDC 112 may convert the electric power stored in the second power supply 111 into electric power of a predetermined voltage and may be outputted from the plurality of SW 115 to SBW 210, the body ECU 220, the mechanical door 230, the E-latch 240, and the brake 250 via the 118.

The collision determination unit 113 is configured to receive a TRG signal from the body ECU 220 and determine whether or not a collision of vehicles has occurred based on TRG signal. Specifically, the collision determination unit 113 determines that a collision of the vehicle has occurred when a Low level TRG signal is inputted. When the collision determination unit 113 determines that there is a collision of the vehicle, information related to the determination is notified to the control unit 114.

The control unit 114 is configured to control the operation of DDC 112 and control the switching of the plurality of SW 115 118 based on the power supply status of the first power supply 300 and the determination information inputted from the collision determination unit 113. The control unit 114 may acquire the power supply status of the first power supply 300 directly from the first power supply 300 or indirectly from an ECU (not shown) that monitors/controls the first power supply 300. When a power supply failure of the first power supply 300 occurs due to some reason (for example, an abnormality of the first power supply 300, a disconnection of a wire, a ground fault, or the like) and when the collision determination unit 113 determines that there is a collision of vehicles, the control unit 114 appropriately switches the connected state (conduction/disconnection) of the plurality of SW 115 118. The control unit 114 suitably controls backup power supply from the second power supply 111 to SBW 210, the body ECU 220, the mechanical door 230, the E-latch 240, and the brake 250. Details of the backup power supply control by the control unit 114 will be described later.

The plurality of SW 115 118 are configured to switch the power supply status (supply/non-supply) from the second power supply 111 to SBW 210, the body ECU 220, the mechanical door 230, the E-latch 240, and the brake 250. SW 115 is provided between DDC 112 and SBW 210. SW 116 is provided between DDC 112 and the body ECU 220. SW 117 is provided between DDC 112 and the E-latch 240. A SW 118 is provided between DDC 112 and the brake 250. As SW 115 118, a switch device such as a mechanical switch or a semi-conductor switch that operates based on an instruction from the control unit 114 is used.

Figure 3:
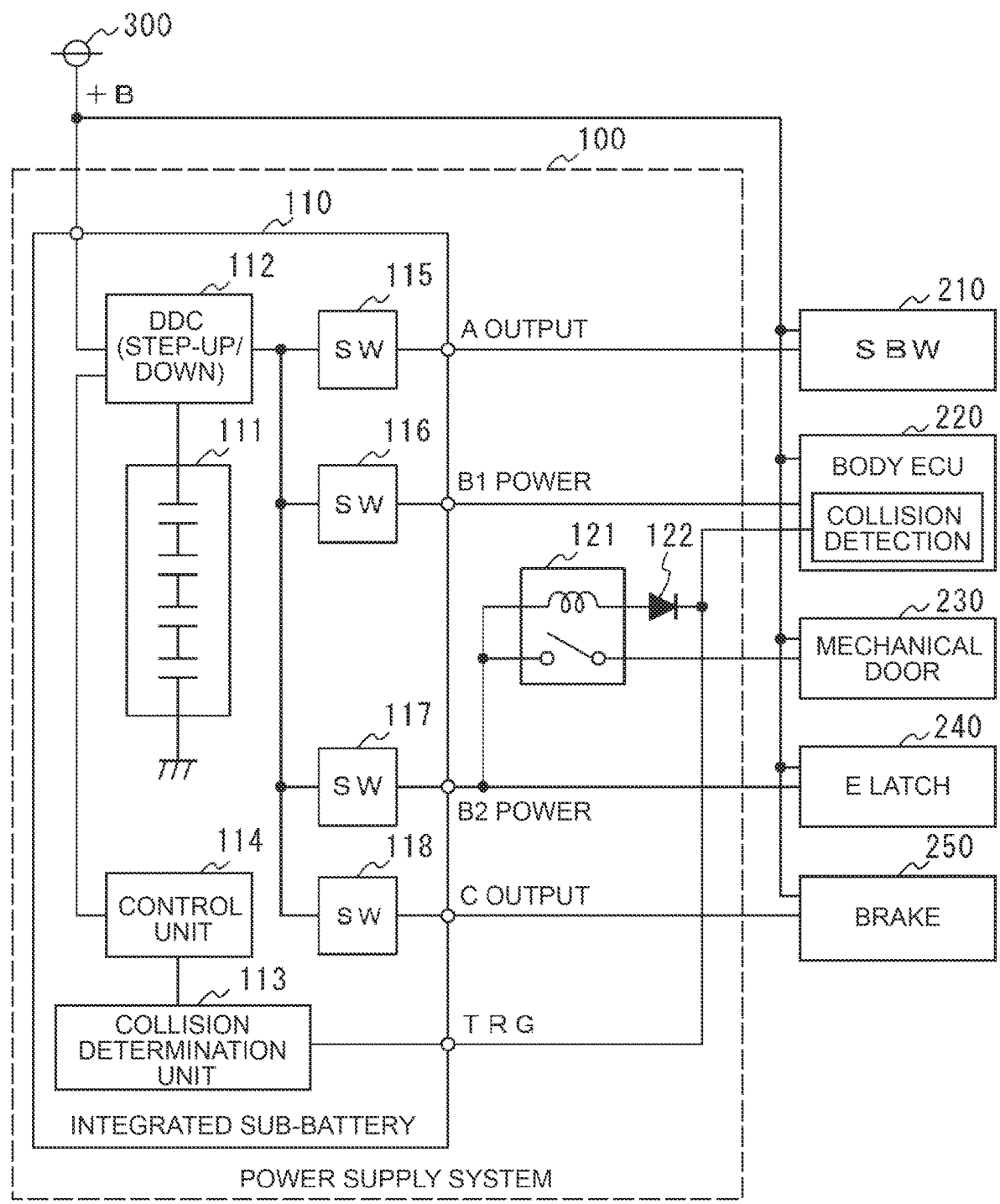
FIG. 3 is a diagram illustrating a configuration of a power supply system according to an embodiment of the present.

The relay 121 is a configuration for controlling backup power supply to the mechanical door 230. The relay 121 is provided between the integrated sub-battery 110 and the mechanical door 230. The relay 121 is, for example, a single-pole, single-throw excitation type mechanical relay. In the excitation mechanical relay, the coil portion is connected between the output of SW 116 (B1 output) and the wire through which TRG signal output from the body ECU 220 flows, and the contact portion is connected between the output of SW 117 (B2 output) and the mechanical door 230 (power supply line). In the configuration illustrated in FIG. 1, B1 power of SW 116 for the body ECU 220 is used as the power supply of the coil portion of the relay 121. However, as in the configuration shown in FIG. 3, B2 power of SW 117 for the E-latch 240 may be used for the power supply of the coiled portion of the relay 121. With this connection, when backup is required, a configuration is constructed in which power supply is supplied directly from the integrated sub-battery 110 to the E latch 240, and power is supplied from the integrated sub-battery 110 to the mechanical door 230 via the relay 121.

The diode 122 is inserted between the coil end of the relay 121 and the wiring of TRG signal with the direction from the coil end to the wiring of TRG signal as the forward direction. The diode 122 is provided to suppress an unintended current from flowing through the coil portion of the relay 121 (current backflow from TRG signal to B1 output) to SW 116 or the body ECU 220 when TRG signal is at High level (in a normal state in which there is no collision detection). The diode 122 can prevent a fault detection malfunction of the integrated sub-battery 110 caused by the current backflow.

Control

Figure 2:
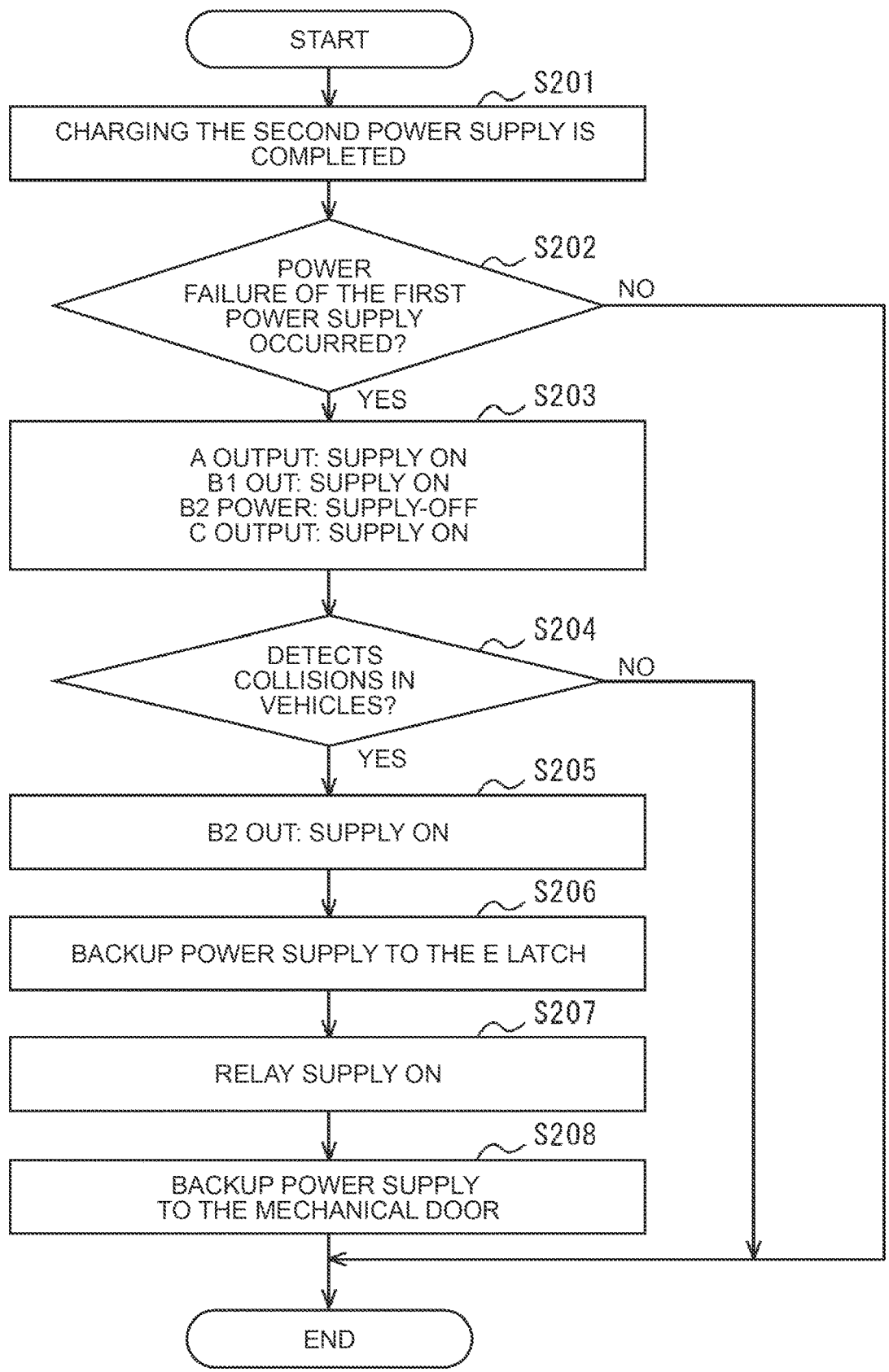
FIG. 2 is a process flow chart of power-supply control executed by a power supply system.

Next, the operation of the power supply system 100 according to an embodiment of the present disclosure will be described with further reference to FIG. 2. FIG. 2 is a flowchart illustrating a processing procedure of backup power supply control executed by the power supply system 100. The backup power supplying control illustrated in FIG. 2 is started, for example, when the ignition relay of the vehicle is turned IGR-ON.

S201

The power supply system 100 completes the necessary charging of the second power supply 111. When the power supply of the first power supply 300 fails due to the completion of the charge, SBW 210 using the second power supply 111, the body ECU 220, the mechanical door 230, the E-latch 240, and the brake 250 can be supplied with backup power. When the required charge to the second power supply 111 is completed, the process proceeds to S202.

S202

The power supply system 100 determines whether a power failure of the first power supply 300 has occurred. The power failure of the first power supply 300 includes, for example, a condition in which electric power cannot be normally supplied from the first power supply 300 to SBW 210, the body ECU 220, the mechanical door 230, the E-latch 240, and the brake 250, such as an abnormality or a failure of the first power supply 300, a disconnection of the power supply line, and a ground fault. If the power supply system 100 determines that the power supply failure of the first power supply 300 has occurred (S202, Yes), the process proceeds to S203. On the other hand, when the power supply system 100 determines that the power supply failure of the first power supply 300 has not occurred (S202, No), the backup power supply control is ended.

S203

The power supply system 100 switches the status of SW 115 118 by the control unit 114 so that backup electric power can be supplied from the integrated sub-battery 110 to SBW 210, the body ECU 220, and the brake 250. Specifically, the power supply system 100 controls SW 115 to be in a conductive state to turn on the supply of the A output, controls SW 116 to be in a conductive state to turn on the supply of B1 output, controls SW 117 to be in a cutoff state to turn off the supply of B2 output, and controls SW 118 to be in a conductive state to turn on the supply of the C output. When SW 115 controls SBW 210, the body ECU 220, and the 118 so that back-up power can be supplied to the brake 250, the process proceeds to S204.

S204

The power supply system 100 determines whether or not the collision determination unit 113 determines that a vehicle collision has occurred. This determination is made by detecting Low of TRG that changes in response to the body ECU 220 detecting a crash of the vehicle. If it is determined that a vehicle-collision has occurred (S204, Yes), the process proceeds to S205. On the other hand, if it is not determined that the vehicle has collided (S204, No), the backup power supply control is terminated while the supply of B2 power remains off.

S205

The power supply system 100 controls SW 117 to be conductive by the control unit 114 to switch B2 power from the supply-off state to the supply-on state. When B2 power is controlled to be supplied, the process proceeds to S206.

S206

The power supply system 100 is in a state in which backup electric power can be supplied from the integrated sub-battery 110 to the E-latch 240 by switching SW 117 to the conductive state (backup power supply). When the back-up power supply to the E-latch 240 is enabled, the process proceeds to S207.

S207

The power supply system 100 starts supplying power from the integrated sub-battery 110 via the relay 121 by controlling B2 power to supply on (relay supply on). In the above-described S204, TRG signal is Low in response to the body ECU 220 detecting the collision of the vehicle. The excitation current flows through the coil-shaped portion of the relay 121, and the contact portion is already in conduction. Therefore, when B2 power is turned on, the relay supply transitions to the ON state accordingly. When the relay-supply is turned on, the process proceeds to S208.

S208

The power supply system 100 enables backup power supply from the integrated sub-battery 110 to the mechanical door 230 by turning on the relay supply. When the relay 121 is controlled in a state in which backup power supply to the mechanical door 230 is possible, this backup power supply control is ended.

Operations and Effects

As described above, according to the power supply system (power supply system 100) according to an embodiment of the present disclosure, the relay circuit (relay 121, diode 122) is provided between the sub power supply source (second power supply 111) provided for backup of the main power supply source (first power supply 300) and the predetermined first in-vehicle equipment (mechanical door 230). When a collision of the vehicle is detected during the backup operation of the main power supply source by the sub power supply source, the power supply system of the present embodiment performs control to supply the electric power supplied from the sub power supply source to the predetermined second in-vehicle equipment (E latch 240) in parallel to the first in-vehicle equipment via the relay circuit.

By the control using the relay circuit, it is possible to integrate the two backup functions of the first in-vehicle equipment and the second in-vehicle equipment into one by using one sub-battery without providing a sub-battery necessary for backup for each of the first in-vehicle equipment and the second in-vehicle equipment having different system control. Therefore, it is expected that the size of the power supply system 100 may be reduced, the number of components may be increased, and the system cost may be increased.

Although an embodiment of the present disclosure has been described above, the present disclosure can be regarded as not only a power supply system but also a control method performed by the power supply system, a program of the control method, a computer-readable non-transitory storage medium storing the program, a vehicle including the power supply system, and the like.

The power supply system of the present disclosure can be used as a system for supplying backup electric power to a plurality of in-vehicle equipment such as an SBW/body/door unlock (mechanical door, E-latch)/brake using an integrated sub-battery.

What is claimed is:

1. A power supply system for a vehicle, for controlling electric power supply from a second power supply provided for backup of a first power supply to a plurality of pieces of in-vehicle equipment, the power supply system comprising a relay interposed between the second power supply and first in-vehicle equipment, wherein,
   when collision of the vehicle is detected during a backup operation of the first power supply by the second power supply, electric power supplied from the second power supply to second in-vehicle equipment is supplied in parallel to the first in-vehicle equipment via the relay.

2. The power supply system according to claim 1, wherein the relay is an excitation mechanical relay, and supplies electric power from the second power supply to the first in-vehicle equipment by controlling a contact to a conducting state by supplying an excitation current to a coil portion in response to collision of the vehicle being detected.

3. The power supply system according to claim 1, wherein:
   the first in-vehicle equipment is equipment that controls locking and unlocking of a door of the vehicle by a motor actuator; and
   the second in-vehicle equipment is equipment that controls locking and unlocking of a door of the vehicle by a latch mechanism.

* * * * *